United States Patent
Covington

(10) Patent No.: US 7,042,685 B2
(45) Date of Patent: May 9, 2006

(54) SUPPRESSION OF THERMALLY ACTIVATED MAGNETIZATION FLUCTUATIONS IN MAGNETORESISTIVE ELEMENTS VIA SPIN MOMENTUM TRANSFER

(75) Inventor: Mark Covington, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 309 days.

(21) Appl. No.: 10/671,160

(22) Filed: Sep. 25, 2003

(65) Prior Publication Data

US 2004/0061981 A1    Apr. 1, 2004

Related U.S. Application Data

(60) Provisional application No. 60/414,844, filed on Sep. 30, 2002.

(51) Int. Cl.
   *G11B 5/39* (2006.01)
(52) U.S. Cl. .................................... 360/324.1
(58) Field of Classification Search ............. 360/324.1, 360/324.2, 324, 322, 313, 110
   See application file for complete search history.

(56) References Cited

U.S. PATENT DOCUMENTS

| 5,695,864 | A | 12/1997 | Slonczewski | 428/212 |
|---|---|---|---|---|
| 6,021,065 | A | 2/2000 | Daughton et al. | 365/158 |
| 6,114,719 | A * | 9/2000 | Dill et al. | 257/295 |
| 6,130,814 | A | 10/2000 | Sun | 361/143 |
| 6,147,900 | A | 11/2000 | Pohm | 365/158 |
| 6,256,223 | B1 | 7/2001 | Sun | 365/171 |
| 6,275,411 | B1 | 8/2001 | Daughton et al. | 365/158 |
| 6,363,007 | B1 | 3/2002 | Lu et al. | 365/158 |
| 6,781,801 | B1 * | 8/2004 | Heinonen et al. | 360/324.2 |
| 2003/0206380 | A1 * | 11/2003 | Seigler et al. | 360/324 |
| 2005/0041342 | A1 * | 2/2005 | Huai et al. | 360/324.12 |

OTHER PUBLICATIONS

Weber et al, "The Ferromagnetic Spin Filter", Sep. 1999, IEEE Transactions on Magnetics, v. 35, No. 5, pp. 2907-2909.*

Ansermet, "Classical Description of Spin Wave Excitation by Currents in Bulk Ferromagnets", Mar. 2004, IEEE Transactions on Magnetics, v. 40, No. 2, pp. 358-360.*

(Continued)

*Primary Examiner*—Julie Anne Watko
(74) *Attorney, Agent, or Firm*—Kinney & Lange, P.A.

(57) ABSTRACT

A system and method of reducing noise due to thermally activated spin waves in a magnetoresistive (MR) element is disclosed. The MR element includes a free layer, a reference layer, and a spacer layer, the spacer layer being positioned between the free layer and the reference layer. To reduce noise, a magnetization of the reference layer is pinned in a fixed direction. A spin polarized current perpendicular to a plane of the free layer, reference layer, and spacer layer is subsequently produced such that the current exerts a spin momentum transfer torque on localized electron spins to reduce noise due to thermally activated spin waves. The spin momentum transfer torque opposes the intrinsic damping of the free layer, thereby reducing noise in the MR element.

34 Claims, 7 Drawing Sheets

OTHER PUBLICATIONS

"Control of Magnetization Dynamics in $Ni_{81}Fe$ Thin Films Through the Use of Rare-Earth Dopants", Bailey et al., *IEEE Transactions on Magnetics*, vol. 37, No. 4, Jul. 2001.

"Spin Transfer Induced Noise in CPP Read Heads", Jian-Gang Ahu and Xiaochun Zhu.

J.A. Katine, F.J. Albert, R.A. Buhrman, E.B. Myers and D.C. Ralph. Current-Driven Magnetization Reversal and Spin-Wave Excitations in Co/Cu/Co Pillars. *Physical Review Letters*, vol. 84, No. 14, Apr. 3, 2000, pp. 3149-3152.

Jian-Gang Zhu. Thermal Magnetic Noise and Spectra in Spin Valve Heads. *Journal of Applied Physics*, vol. 91, No. 10, May 15, 2002, pp. 7273-7275.

Thermal Magnetization Noise in a Thin Film, V.L. Safonov and H.N. Bertram, Phys. Rev. B 65, 172417 (2002).

White-Noise Magnetization Fluctuations in Magnetoresistive Heads, N. Smith and P. Arnett, Appl. Phys. Lett. 78, 1448 (2001).

Current-Driven Excitation of Magnetic Multilayers, J.C. Slonczewski, J. Magn. Magn. Mater. 159, L1 (1996).

* cited by examiner

SUPPRESSION OF THERMALLY ACTIVATED MAGNETIZATION FLUCTUATIONS IN MAGNETORESISTIVE ELEMENTS VIA SPIN MOMENTUM TRANSFER

CROSS-REFERENCE TO RELATED APPLICATION(S)

This application claims priority from Provisional Application No. 60/414,844 filed Sep. 30, 2002, for "Suppression Of Thermally Activated Magnetization Fluctuations In Read Heads Via Spin Momentum Transfer" by Mark W. Covington.

FIELD OF THE INVENTION

The present invention relates generally to the field of magnetic data storage and retrieval systems. In particular, the present invention relates to a magnetoresistive element which uses spin momentum transfer to suppress noise due to thermally activated magnetization fluctuations.

BACKGROUND OF THE INVENTION

In a magnetic data storage and retrieval system, a magnetic recording head typically includes a read head having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a bias current through the MR sensor and measuring a voltage across the MR sensor. External circuitry then converts the voltage information into an appropriate format and manipulates that information as necessary to recover the information encoded on the disc.

The essential structure in contemporary read heads is a thin film multilayer containing ferromagnetic material that exhibits some type of magnetoresistance. Examples of magnetoresistive phenomena include anisotropic magnetoresistance (AMR), giant magnetoresistance (GMR), and tunneling magnetoresistance (TMR). A typical GMR read sensor configuration is the GMR spin valve, in which the GMR read sensor is a multi-layered structure formed of a non-magnetic spacer layer positioned between a ferromagnetic pinned layer and a ferromagnetic free layer. The magnetization of the pinned layer is fixed in a predetermined direction, typically normal to an air bearing surface of the GMR read sensor, while the magnetization of the free layer rotates freely in response to an external magnetic field. The resistance of the GMR read sensor varies as a function of an angle formed between the magnetization direction of the free layer and the magnetization direction of the pinned layer. This multi-layered spin valve configuration allows for a more pronounced magnetoresistive effect (i.e., greater sensitivity and higher total change in resistance) than is possible with anisotropic magnetoresistive (AMR) read sensors, which generally consist of a single ferromagnetic layer.

When the recording head is scanned over a disc, the free layer magnetization will rotate in response to the stray fields emerging from the bits in the media, producing changes in resistance. However, thermal energy induces stochastic fluctuations in the free layer magnetization that results in random resistance fluctuations. This phenomenon is referred to as mag-noise (see N. Smith and P. Arnett, Appl. Phys. Lett. 78, 1448 (2001)) and it originates from the thermal excitation of spin waves (the variation of the magnetization in a ferromagnetic material due to precession of the spins that make up the magnetization) in the free layer. Although readers operate in a frequency bandwidth that lies below the resonant frequency of the spin wave modes, the intrinsic damping of these modes leads to significant fluctuation amplitude below resonance. A theoretical description of this phenomenon (see V. L. Safonov and H. N. Bertram, Phys. Rev. B Vol. 65, 172417 (2002)) expresses the spectral noise power as $$S_V = C_V^2 \frac{\gamma k_B T}{M_S V} \sqrt{\left(\frac{H_K + 4\pi M_S + H}{H_K + H}\right)} \frac{\alpha 2\pi \gamma M_S}{\omega_0} F(\omega), \quad \text{(Eq. 1)}$$

where the coefficient $C_V$ is given by $$C_V = I_b \frac{\partial R}{\partial H} \frac{\partial H}{\partial m}, \quad \text{(Eq. 2)}$$

and $$F(\omega) = \frac{1}{(\omega_0 - \omega)^2 + (\alpha 2\pi \gamma M_S)^2} + \frac{1}{(\omega_0 + \omega)^2 + (\alpha 2\pi \gamma M_S)^2}. \quad \text{(Eq. 3)}$$

In Equations 1, 2, and 3, $\gamma$ is the gyromatic ratio; $k_B$ is Boltzmann's constant; T is temperature; $M_S$, V, and $H_K$, are respectively the saturation magnetization, volume, and uniaxial anisotropy of the free layer; H is the external magnetic field; $\alpha$ is the Gilbert damping coefficient from the Landau-Lifshitz equation (a dimensionless coefficient typically having a range of 0.004 to 0.15 for physical materials); $I_b$ is the bias current; R is the device resistance; and m is the normalized free layer magnetization. This formulation assumes excitation of only the lowest order, uniform spin wave mode having a resonant frequency of $\omega_0/2\pi$. Additional assumptions that factor into Equation 1 are that the free layer is biased orthogonally to the pinned layer and that the angular fluctuations of the free layer are small.

The primary implication of this phenomenon is that the noise amplitude scales linearly with the bias current and can become significantly larger than the Johnson noise (the noise generated by thermal agitation of electrons in a conductor). This creates a problem because any potential degradation of the reader signal-to-noise ratio can negatively impact the performance of the overall recording system. Further compounding this problem is that, as Equation 1 implies, the noise will increase as the reader volume decreases. Thus, without significant modifications in design, the noise will increase with continued increasing areal density.

The solution to this problem will therefore entail a method to reduce the mag-noise within the reader bandwidth. One approach to reduce the noise is to increase the anisotropy field of the free layer so that the resonant frequency is shifted to higher frequencies. However, this stiffens the free layer magnetization such that reader sensitivity is adversely affected, and the signal-to-noise ratio will likely be little changed from its initial state. The best procedure is to implement an approach that will reduce the noise without degrading the reader amplitude.

For frequencies below resonance ($\omega >> \omega_0$), the noise amplitude is directly proportional to the damping coefficient, $\alpha$ (see Equation 1). Reader noise will therefore decrease as α is reduced. It is possible to tailor the material properties of the free layer in order to engineer a reduction in α, but this is a very difficult approach that is potentially hard to control. The present invention reduces reader noise by means of a simpler and more controllable approach.

BRIEF SUMMARY OF THE INVENTION

The present invention is a system and method of reducing noise due to thermally activated spin waves in a magnetoresistive (MR) element. The invention uses spin momentum transfer to produce a lower effective α for a free layer of the MR element and thereby reduce noise amplitude. That is, a spin polarized current is directed perpendicular to a plane of the MR element such that the current exerts a spin momentum transfer torque on localized electron spins in the free layer. The spin polarized current is preferably produced by passing a current through a ferromagnetic material, which acts as an electron spin filter that polarizes conduction electrons in the current. The spin momentum transfer torque opposes the intrinsic damping of the free layer, thereby reducing noise in the MR element.

In one embodiment, the MR element includes a free layer, a reference layer, and a spacer layer, the spacer layer being positioned between the free layer and the reference layer. The magnetization of the reference layer is pinned in a fixed direction. A spin polarized current perpendicular to the plane of the free layer, reference layer, and spacer layer is produced such that the current exerts a spin momentum transfer torque on localized electron spins in the free layer.

In another embodiment, the MR element includes two free layers having a magnetization which rotates in response to an external magnetic field separated by a nonmagnetic spacer layer. Two reference layers having a magnetization pinned in a fixed direction are positioned on opposite ends of the MR element, spaced from the MR element by a spacer layer. A spin polarized current perpendicular to the plane of these layers is produced such that the current exerts a spin momentum transfer torque on localized electron spins in the free layers.

BRIEF DESCRIPTION OF THE DRAWINGS

FIG. 8b shows a top view of an MR stack according to the embodiment of the present invention shown in FIG. 8a.

DETAILED DESCRIPTION

Figure 1:
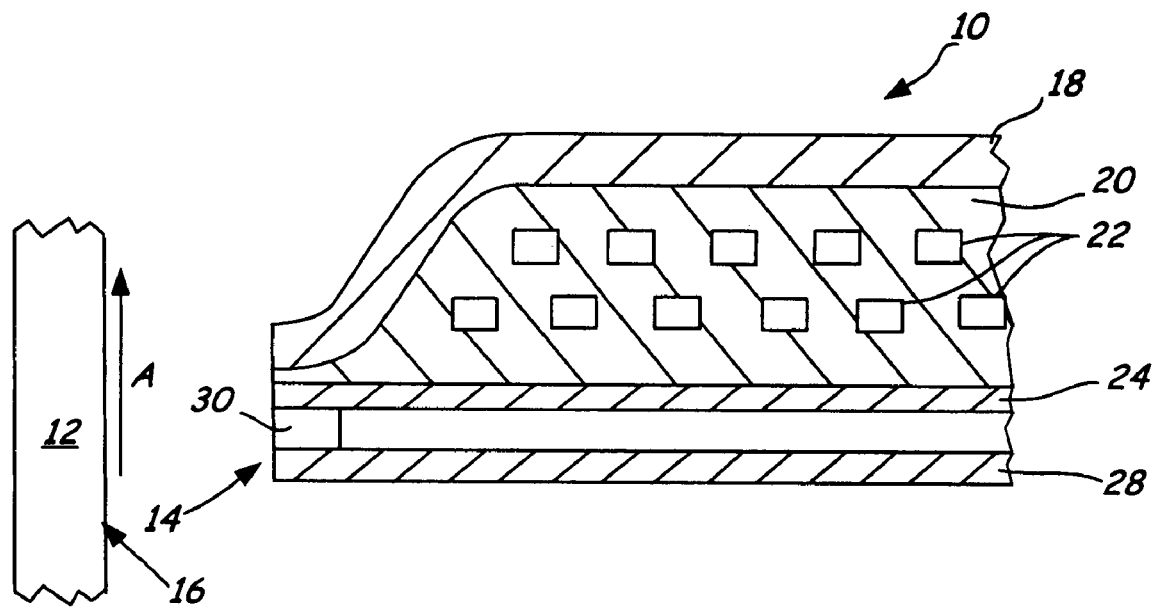
FIG. 1 is a cross-sectional view of a magnetic read/write head and magnetic disc taken along a plane normal to an air bearing surface of the read/write head.

FIG. 1 is a cross-sectional view of magnetic read/write head 10 and magnetic disc 12 taken along a plane normal to air bearing surface 14 of read/write head 10. Air bearing surface 14 of magnetic read/write head 10 faces disc surface 16 of magnetic disc 12. Magnetic disc 12 travels or rotates in a direction relative to magnetic read/write head 10 as indicated by arrow A. Spacing between air bearing surface 14 and disc surface 16 is preferably minimized while avoiding contact between magnetic read/write head 10 and magnetic disc 12.

A writer portion of magnetic read/write head 10 includes top pole 18, insulator 20, conductive coils 22 and bottom pole/top shield 24. Conductive coils 22 are held in place between top pole 18 and top shield 24 by use of insulator 20. Conductive coils 22 are shown in FIG. 1 as two layers of coils but may also be formed of any number of layers of coils as is well known in the field of magnetic read/write head design.

A reader portion of magnetic read/write head 10 includes bottom pole/top shield 24, bottom shield 28, and magnetoresistive (MR) stack 30. MR stack 30 is positioned between terminating ends of bottom pole 24 and bottom shield 28. Bottom pole/top shield 24 functions both as a shield and as a shared pole for use in conjunction with top pole 18.

Figure 2:
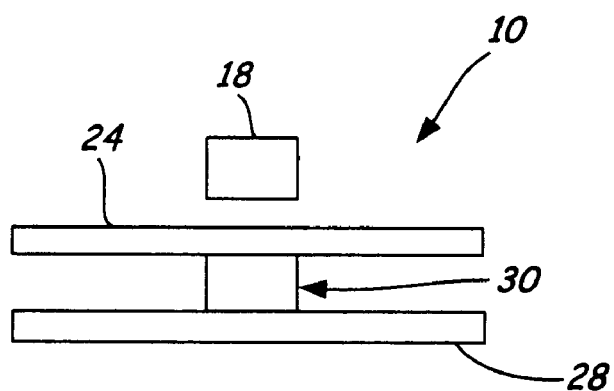
FIG. 2 is a layer diagram of an air bearing surface of the magnetic read/write head.

FIG. 2 is a layer diagram of air bearing surface 14 of magnetic read/write head 10. FIG. 2 illustrates the location of magnetically significant elements in magnetic read/write head 10 as they appear along air bearing surface 14 of magnetic read/write head 10 of FIG. 1. In FIG. 2, all spacing and insulating layers of magnetic read/write head 10 are omitted for clarity. Bottom shield 28 and bottom pole/top shield 24 are spaced to provide for a location of MR stack 30. A sense current is caused to flow through MR stack 30 via bottom pole/top shield 24 and bottom shield 28. While the sense current is injected through the bottom pole/top shield 24 and bottom shield 28 in FIGS. 1 and 2, other configurations have MR stack 30 electrically isolated from bottom pole/top shield 24 and bottom shield 28, with additional leads providing the sense current to MR stack 30. As the sense current is passed through MR stack 30, the read sensor exhibits a resistive response, which results in a varied output voltage. Because the sense current flows perpendicular to the plane of MR stack 30, the reader portion of magnetic read/write head 10 is a current-perpendicular-to-plane (CPP) type device. Magnetic read/write head 10 is merely illustrative, and other CPP configurations may be used in accordance with the present invention.

Figure 3:
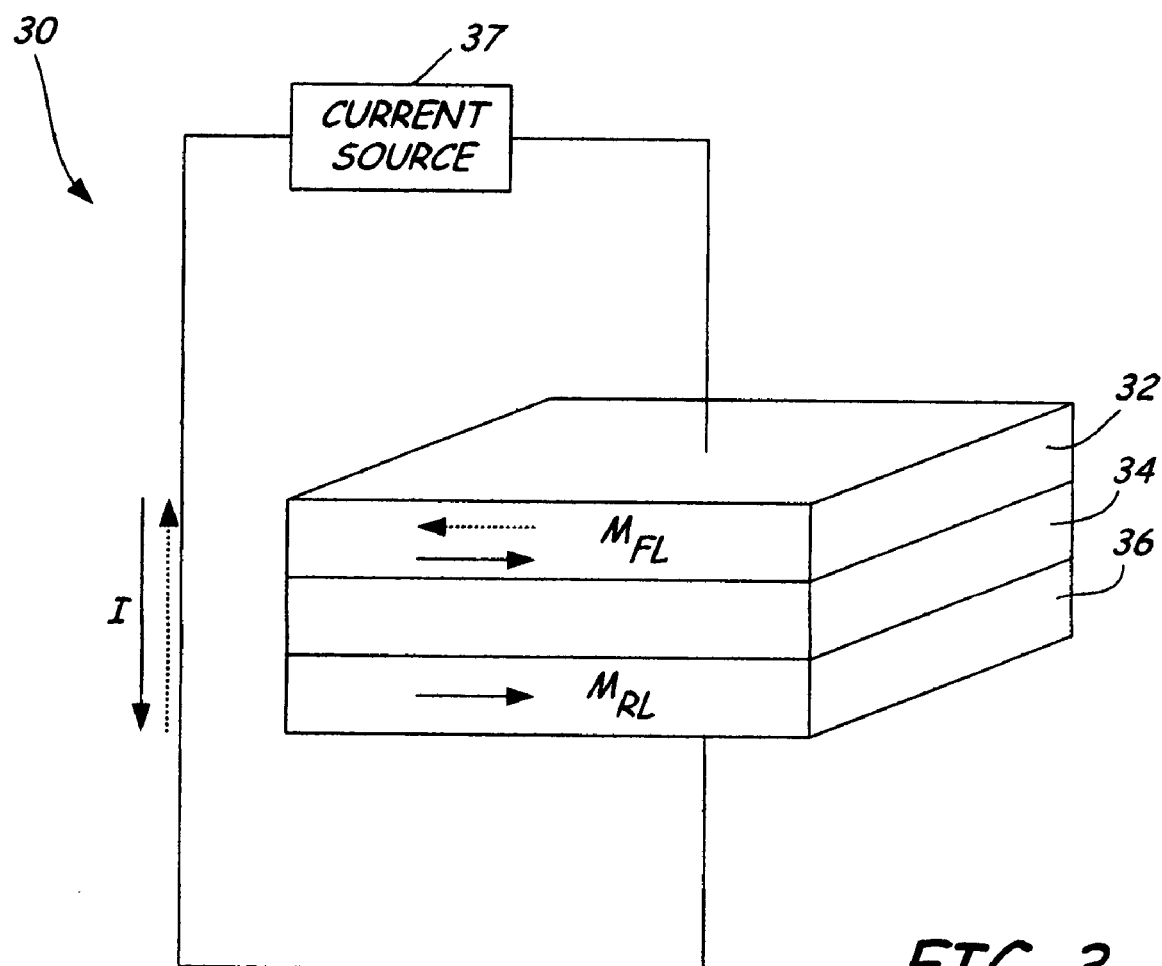
FIG. 3 shows a perspective ABS view of the basic elements of a magnetoresistive (MR) stack according to the present invention.

FIG. 3 shows a perspective ABS view of the basic elements of MR stack 30 according to the present invention. MR stack 30 includes free layer 32, spacer layer 34, and pinned reference layer 36. Spacer layer 34 is positioned between free layer 32 and pinned reference layer 36. Spacer layer 34 is typically made of a non-magnetic metallic material, and can be, for example, a conducting spacer to form a current perpendicular-to-plane GMR sensor. Pinned reference layer 36 typically has one of three configurations: a single, soft ferromagnetic layer that is exchange coupled to an antiferromagnet or permanent magnet; a permanent magnet; or a single layer within a pinned synthetic antiferromagnet. A synthetic antiferromagnet consists of two ferromagnetic layers separated by a nonmagnetic spacer layer, such as Ru, that strongly favors antiparallel alignment between the two ferromagnetic layers. For clarity, FIG. 3 shows pinned reference layer 36 as a single layer.

The general trend in the hard disc drive industry is towards using reader designs in which the bias current flows perpendicular to the plane (CPP) of the thin film multilayer. Among the potential designs are magnetic tunnel junctions, CPP spin valves, and CPP GMR multilayers. The ferromagnetic layers within these devices act as spin filters that polarize conduction electrons. Such a spin polarized CPP current can exert a significant torque on the localized electron spins in a ferromagnet. This effect is called spin momentum transfer and its impact can be described by including it in the Landau-Lifshitz equation of motion. For the three layer structure shown in FIG. 1, the equation of motion for free layer 32 is given by:

$$\frac{\partial \vec{m}_{FL}}{\partial t} = -\gamma \vec{m}_{FL} \times [\vec{H}_{eff} + \alpha \vec{m}_{FL} \times \vec{H}_{eff}] + (\hbar j g / e) \vec{m}_{FL} \times \vec{m}_{FL} \times \vec{m}_{RL},$$ (Eq. 4)

where $H_{eff}$ includes all effective magnetic fields acting on free layer 32, h is Planck's constant, j is the current density, g is a factor that depends on the spin polarization in the ferromagnets, and e is the electron charge. The first two terms on the right hand side are the torque and damping terms in the Landau-Lifshitz equation. Spin momentum transfer torque exerted on free layer 32 by pinned reference layer 36 is given by the last term on the right hand side. Spin momentum transfer torque is the torque exerted on localized electron spins in a ferromagnet by spin polarized CPP current, I (provided by a circuit such as current source 37). For typical reader designs, $m_{FL}$, $m_{RL}$, and $H_{eff}$ all lie predominantly in the plane of MR stack 30. Thus, the damping torque and the spin momentum transfer torque are both in the plane of free layer 32 and, depending on current direction, directed along either the same or opposite direction.

Figure 4A:
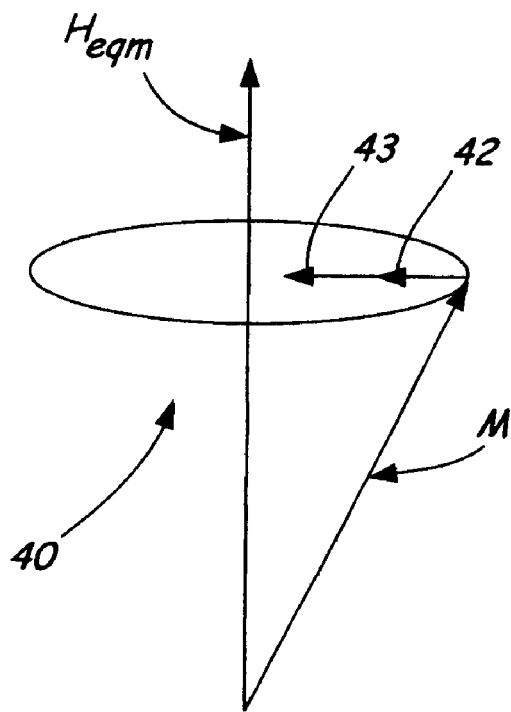
FIG. 4a shows a schematic illustration of magnetization precession showing the direction of the phenomenological damping torque and that of the spin momentum transfer torque when they act in the same direction.
Figure 4B:
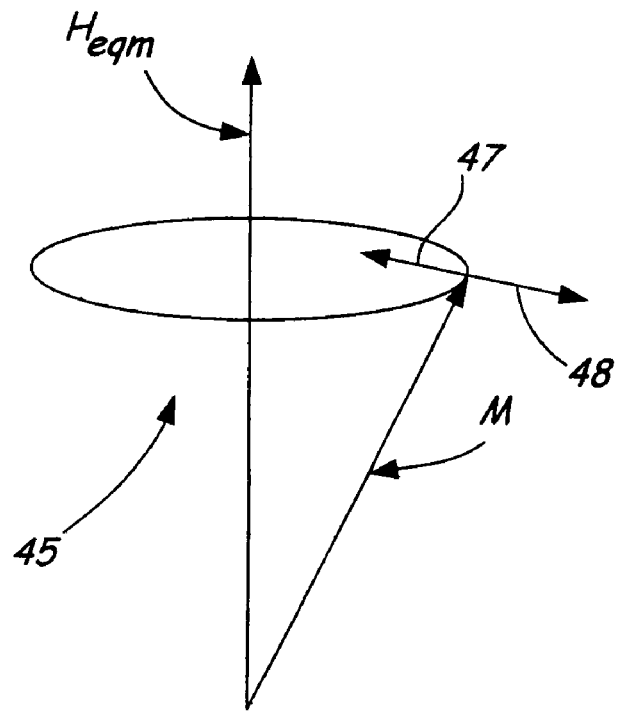
FIG. 4b shows a schematic illustration of magnetization precession showing the direction of the phenomenological damping torque and that of the spin momentum transfer torque when they act in opposite directions.

FIG. 4a shows schematic 40 of magnetization precession, including magnetization vector M, equilibrium magnetic field vector $H_{eqm}$, phenomenological damping torque vector 42, and spin momentum transfer torque vector 43, showing the direction of phenomenological damping torque 42 and that of spin momentum transfer torque 43 when they act in the same direction. FIG. 4b shows spin wave schematic 45 of magnetization precession, including magnetization vector M, equilibrium magnetic field vector $H_{eqm}$, phenomenological damping torque 47, and spin momentum transfer torque 48, showing the direction of phenomenological damping torque 47 and that of spin momentum transfer torque 48 when they act in opposite directions. The net result is that the magnitude and direction of the CPP current can be used to tune the effective damping coefficient in order to reduce the mag-noise. This approach has the added advantage in that it does not affect reader sensitivity or amplitude.

Referring back to FIG. 3, magnetization $M_{RL}$ of pinned reference layer 36 is pinned in a fixed direction and magnetization $M_{FL}$ of free layer 32 points in a direction based on the net magnetic field acting on free layer 32 (typically, either parallel or antiparallel to $M_{RL}$). An electrical current, I, flows perpendicular to these layers with a direction and magnitude based on the directions of $M_{RL}$ and $M_{FL}$.

Figure 5:
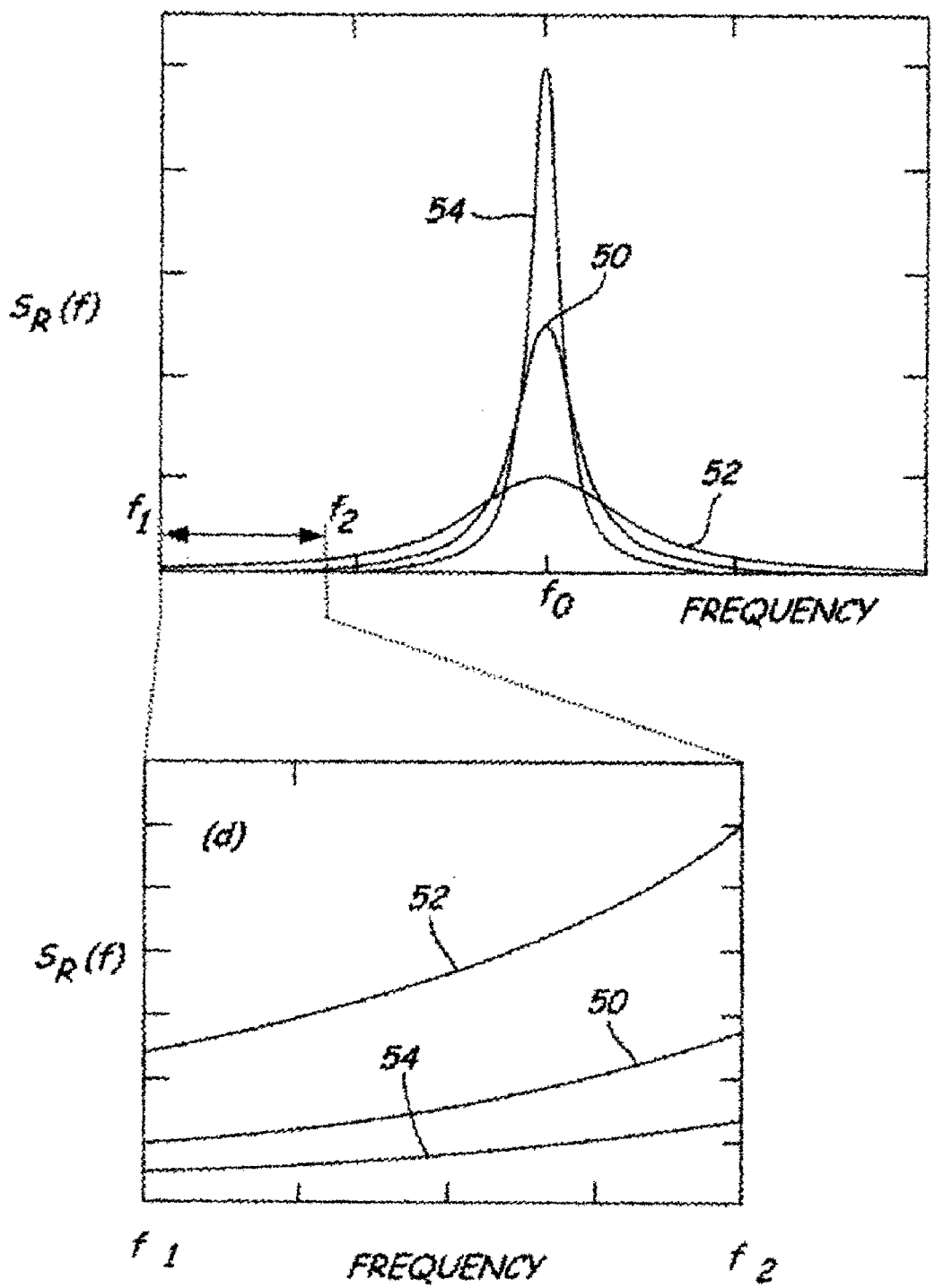
FIG. 5 shows a graph of the fluctuation amplitude due to thermally activated spin waves of the resistance through the MR stack of the present invention as a function of frequency.

FIG. 5 shows a graph of the fluctuation amplitude due to thermally activated spin waves of the resistance through MR stack 30 as a function of frequency. FIG. 5 also shows a close up view within the operating frequency ($f_1$ to $f_2$) of the reader containing MR stack 30. As can be seen, there is a peak in the resistance fluctuations around the spin wave resonance frequency, $f_0$. Plot 50 shows the resistance through MR stack 30 when a small current is passed through MR stack 30. The width of this peak can be modified from its intrinsic value by passing a CPP current through the structure and varying the magnitude and direction of the CPP current. If a large CPP current is passed through MR stack 30 in a direction such that the spin momentum transfer torque and the damping torque point in the same direction, as depicted in FIG. 4a, then the peak near the spin wave resonant frequency ($f_0$) is broadened and the mag-noise in the operating range is increased (graphed in FIG. 5 as plot 52). Conversely, if a large CPP current is passed through MR stack 30 in a direction such that the spin momentum transfer torque and the damping torque point in opposite directions, as depicted in FIG. 4b, then the peak near the spin wave resonant frequency ($f_0$) is narrowed and the mag-noise in the operating range is decreased (graphed in FIG. 5 as plot 54).

Figure 6A:
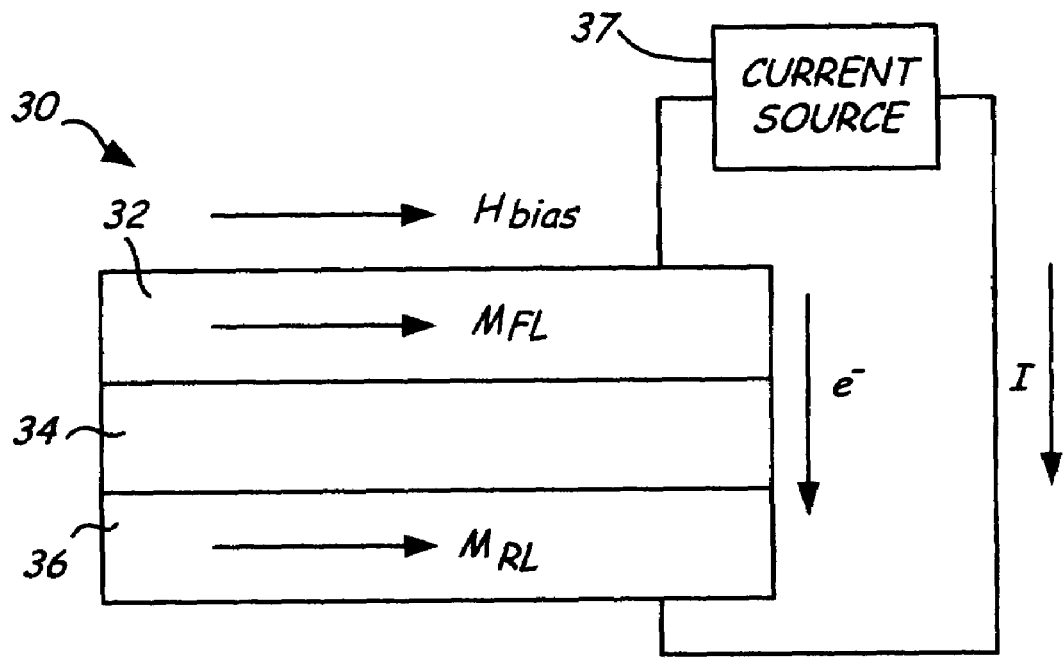
FIG. 6a is a schematic of a first example of an MR stack biased according to the method of the present invention.
Figure 6B:
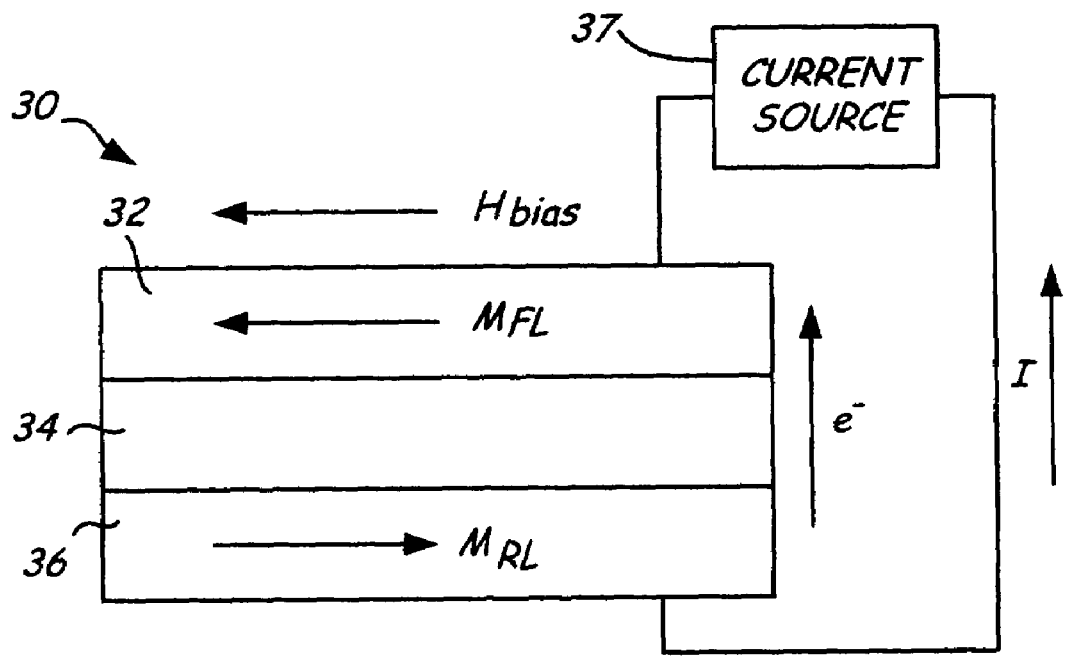
FIG. 6b is a schematic of a second example of an MR stack biased according to the method of the present invention.

FIGS. 6a and 6b are schematics of two examples of MR stack 30 biased according to the method of the present invention. MR stack 30 includes free layer 32, spacer layer 34, and pinned reference layer 36. Spacer layer 34 is positioned between free layer 32 and pinned reference layer 36. Spacer layer 34 is typically made of a non-magnetic material, and can be, for example, a conducting spacer to form a current perpendicular-to-plane GMR sensor. Free layer 32 is typically made of a soft ferromagnetic material (e.g., CoFe) and spacer layer 34 is typically made of a non-magnetic metal (e.g., Cu). Pinned reference layer 36 typically has one of three configurations: a single, soft ferromagnetic layer that is exchange coupled to an antiferromagnet or permanent magnet; a permanent magnet; or a single layer within a pinned synthetic antiferromagnet. For clarity, FIGS. 6a and 6b show pinned reference layer 36 as a single layer.

The magnetization configuration and current direction for MR stack 30 depend on the spin polarization of majority electrons within free layer 32 and pinned reference layer 36. Also, the magnetization configuration and current direction depend on whether minority or majority electrons are predominantly scattered at the interface between pinned reference layer 36 and spacer layer 34 (for the configuration shown in FIG. 6a), or between free layer 32 and spacer layer 34 (for the configuration shown in FIG. 6b). Majority electrons have spin angular momentum aligned along the same direction of the magnetization, while minority electrons are electrons that spin in the opposite direction of the magnetization. A spin polarized current has an unequal population of majority and minority spin electrons. In the examples shown in FIGS. 6a and 6b, the majority electrons in both free layer 32 and pinned reference layer 36 are spin polarized in the same direction as the magnetization, and the minority electrons are predominantly scattered at the nonmagnetic/ferromagnetic interface. FIGS. 6a and 6b are merely illustrative, and the current direction and magnetization configuration in these schematics are alterable to adapt to other situations, such as where the majority electrons in the ferromagnetic layers are spin polarized antiparallel to the magnetization and/or the majority electrons are predominantly scattered at the non-magnetic/ferromagnetic interface.

In FIGS. 6a and 6b, MR stack 30 is under the influence of a magnetic field, $H_{bias}$. The magnetization of free layer 32 rotates to align with $H_{bias}$. Preferably, the magnetization of free layer 32 and the magnetization of pinned reference layer 36 are parallel or antiparallel. This is because intermediate magnetization angles between free layer 32 and pinned reference layer 36 diminish the effect of the spin momentum transfer torque on the mag-noise.

In FIG. 6a, the magnetization of free layer 32 ($M_{FL}$) and the magnetization of pinned reference layer 36 ($M_{RL}$) point in the same direction. The direction of current I (provided by a circuit such as current source 37) is chosen so that the spin momentum transfer torque opposes intrinsic damping in free layer 32. Thus, current I is directed from pinned reference layer 36 to free layer 32, thereby causing electrons (e⁻) to migrate across the spacer layer 34 from free layer 32 to pinned reference layer 36.

Similarly, in FIG. 6b, the magnetization of free layer 32 ($M_{FL}$) and the magnetization of pinned reference layer 36 ($M_{RL}$) point in opposite directions. Again, the direction of current I (provided by a circuit such as current source 37) is chosen so that the spin momentum transfer torque opposes intrinsic damping in free layer 32. In this case, current I is directed from free layer 32 to pinned reference layer 36, thereby causing electrons (e⁻) to migrate across spacer layer 34 from pinned reference layer 36 to free layer 32. The magnetization and current configurations shown in FIGS. 6a and 6b reduce mag-noise in a typical CoFe/Cu/CoFe trilayer MR stack 30.

In both FIG. 6a and FIG. 6b, the selected magnitude of the spin momentum transfer torque is large enough to produce the desired reduction in the effective damping coefficient ($\alpha$, in Equation 1), but not so large that spin transfer will induce a magnetization reversal of the free layer away from the direction set by the net bias field. If the spin momentum transfer torque is too large (especially when using a copper spacer between free layer 32 and reference layer 36), the torque can be reduced by varying the thickness or resistivity (through the use of different materials) of spacer layer 34, or by adding paramagnetic impurities to spacer layer 34.

Figure 7:
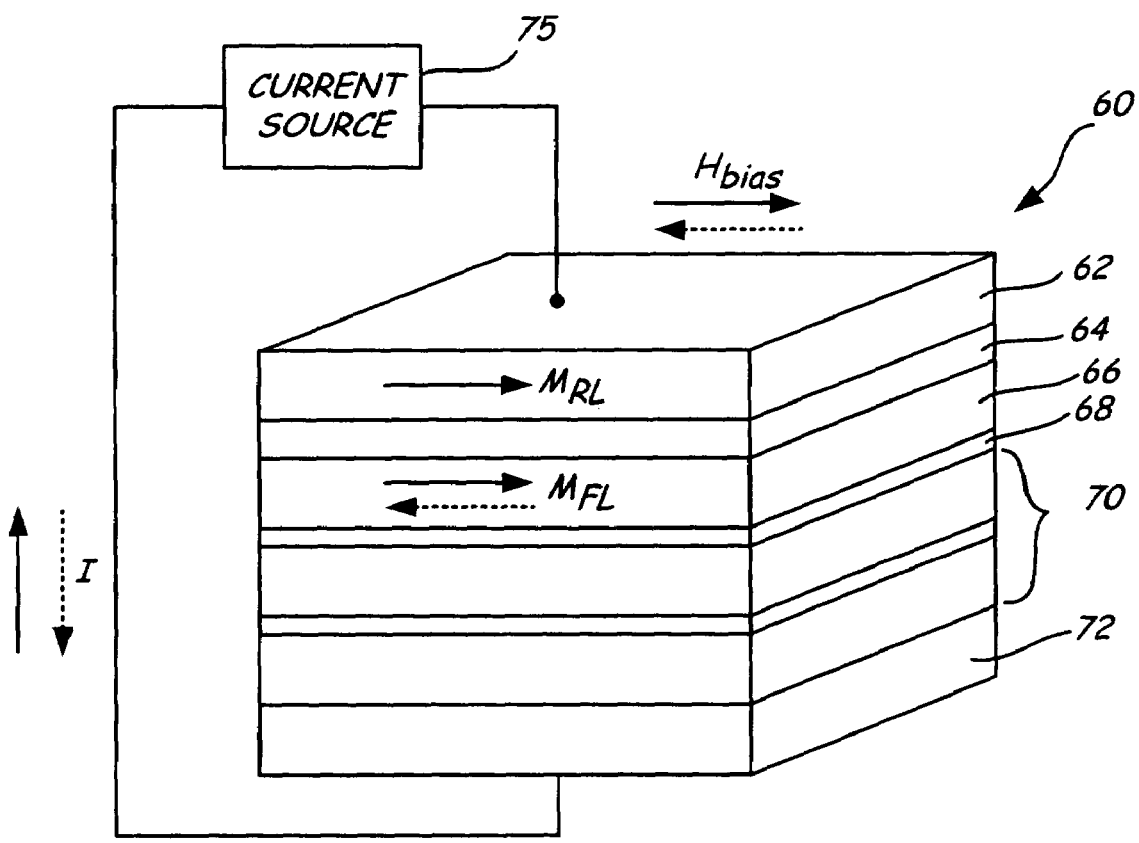
FIG. 7 shows a perspective ABS view of an MR stack according to an embodiment of the present invention.

FIG. 7 shows a perspective ABS view of MR stack 60 according to an embodiment of the present invention. MR stack 60 can be used in place of MR stack 30 in FIGS. 1 and 2. MR stack 60 includes pinned reference layer 62, first spacer layer 64, free layer 66, second spacer layer 68, pinned synthetic antiferromagnetic (SAF) 70, and pinning layer 72. Free layer 66 is typically made of a soft ferromagnetic material (e.g., CoFe) having a magnetization, $M_{FL}$, that is free to rotate in response to external magnetic fields. First spacer layer 64 is positioned between pinned reference layer 62 and free layer 66. Second spacer layer 68 is positioned between free layer 66 and pinned SAF 70. First spacer layer 64 is typically made of a nonmagnetic metal such as copper. Second spacer layer 68 is typically a nonmagnetic metal, such as Cu, or an insulating tunnel barrier. Pinned reference layer 62 is typically a single, soft ferromagnetic layer that is exchange coupled to an antiferromagnet or permanent magnet. Pinned SAF 70 is typically a multilayer synthetic antiferromagnet having a magnetization that is pinned in a fixed direction by antiferromagnetic pinning layer 72. Antiferromagnetic pinning layer 72 is typically exchange coupled to pinned SAF 70 and is made of an antiferromagnetic material.

To reduce noise caused by thermally activated magnetization fluctuations, the method described with regard to FIGS. 6a and 6b is employed. To recapitulate, MR stack 60 is under the influence of a magnetic field, $H_{bias}$. In the quiescent state of MR stack 60, where there are no fields emanating from the media, the magnetization of free layer 66 rotates to align with this magnetic field. Preferably, the magnetization of free layer 66 and the magnetization of pinned reference layer 62 are either parallel or antiparallel in the quiescent state of the device. This is because intermediate magnetization angles between free layer 66 and pinned reference layer 62 diminish the effect of the spin momentum transfer torque on the mag-noise. The direction of the CPP current, I (provided by a circuit such as current source 75), is chosen so that the spin momentum transfer torque opposes intrinsic damping in free layer 66. CPP current is directed depending on the configurations of the magnetization of free layer 66 ($M_{FL}$) and pinned reference layer 62 ($M_{RL}$). The ferromagnetic layers within MR stack 60 act as spin filters that polarize conduction electrons in the CPP current. Such a spin polarized CPP current exerts a significant torque on the localized electron spins in a ferromagnet. This effect is called spin momentum transfer, and is utilized to oppose the intrinsic damping torque in free layer 66, causing a reduction in noise in free layer 66.

Figure 8A:
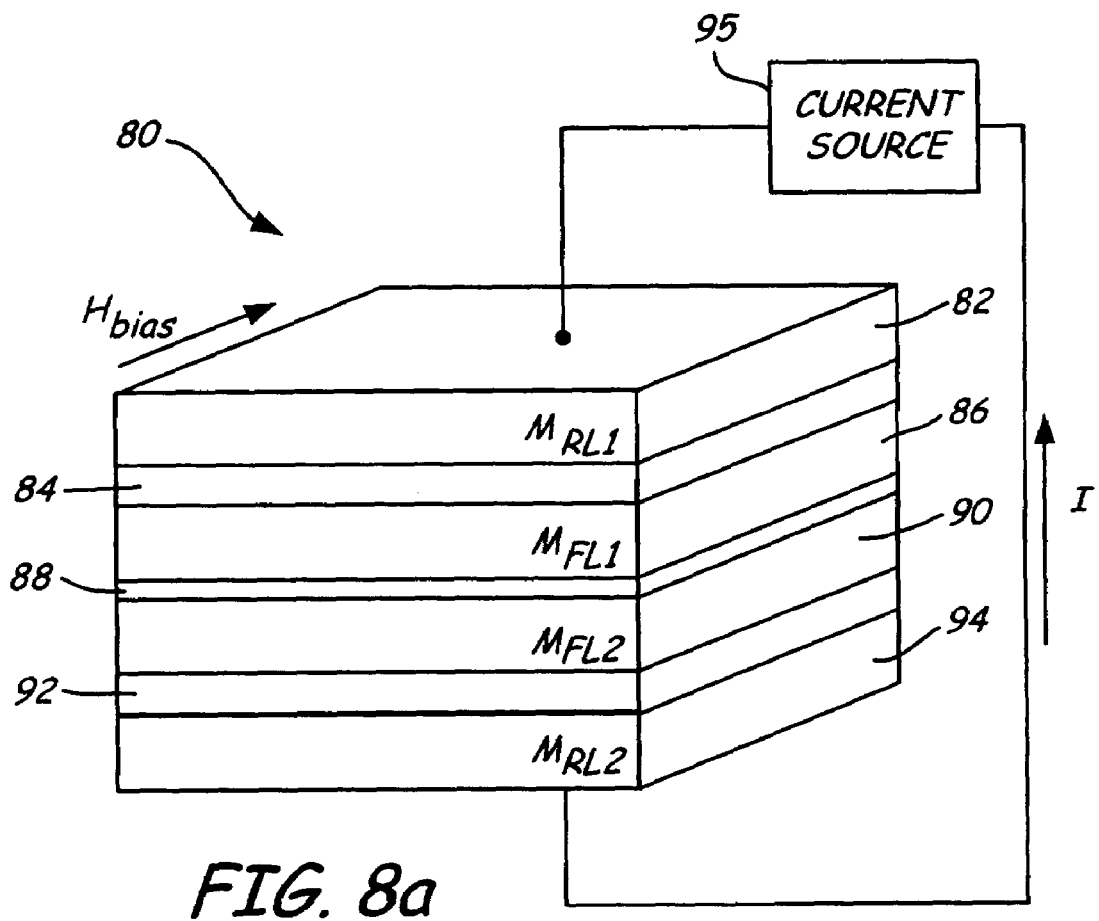
FIG. 8a shows a perspective ABS view of an MR stack according to another embodiment of the present invention.
Figure 8B:
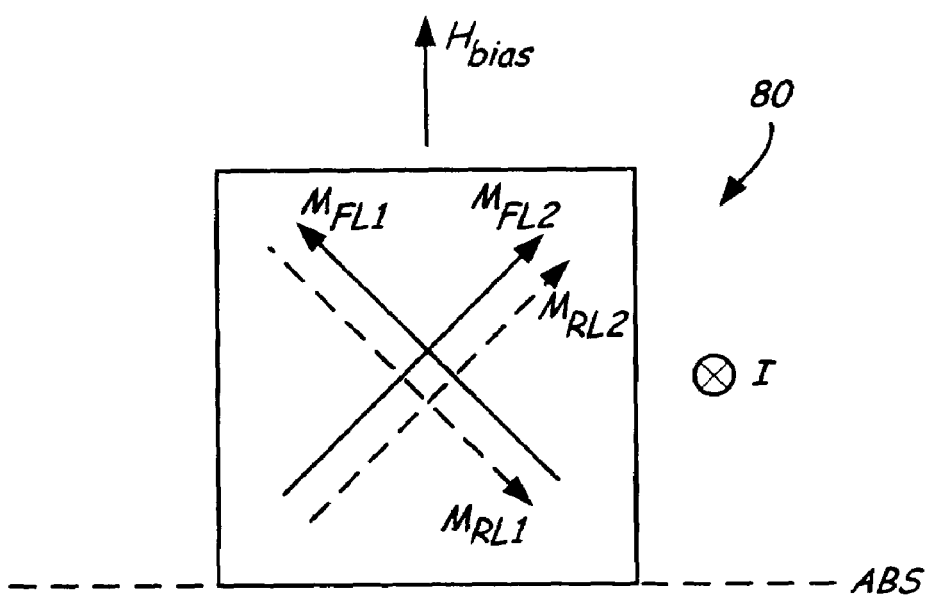

FIG. 8a shows a perspective ABS view and FIG. 8b shows a top view of MR stack 80 according to another embodiment of the present invention. MR stack 80 can be used in place of MR stack 30 in FIGS. 1 and 2. MR stack 80 includes first pinned reference layer 82, first spacer layer 84, first free layer 86, second spacer layer 88, second free layer 90, third spacer layer 92, and second pinned reference layer 94. Free layers 86 and 90 are typically made of a soft ferromagnetic material (e.g., CoFe) and have magnetizations ($M_{FL1}$ and $M_{FL2}$, respectively) that are free to rotate in response to an external magnetic field. First spacer layer 84 is positioned between first pinned reference layer 82 and first free layer 86, second spacer layer 88 is positioned between first free layer 86 and second free layer 90, and third spacer layer 92 is positioned between second free layer 90 and second pinned reference layer 94. First pinned reference layer 82 and second pinned reference layer 94 are made of a ferromagnetic material and have magnetizations ($M_{RL1}$ and $M_{RL2}$, respectively) pinned in fixed directions. First spacer layer 84 and third spacer layer 92 are typically a nonmagnetic metal (e.g., copper) spacer. Second spacer layer 88 is typically a nonmagnetic metal (e.g., copper) spacer or an insulating tunnel barrier.

MR stack 80 requires three biasing sources: a first biasing source to pin the magnetization of first pinned reference layer 82, a second biasing source to pin the magnetization of second pinned reference layer 94, and a third biasing source to bias the magnetization of first free layer 86 and second free layer 90 in an orthogonal configuration with respect to each other. One way of implementing this is to pin first pinned reference layer 82 with a permanent magnet, pin second pinned reference layer 94 with an antiferromagnet, and bias free layers 86 and 90 with an electromagnet.

The operation of MR stack 80 is similar to that of MR stack 60 of FIG. 7. MR stack 80 is under the influence of a magnetic field caused by flux emanating from the surface of a rotating disc (representing different states of data). The magnetization direction $M_{FL1}$ of first free layer 86 and the magnetization direction $M_{FL2}$ of second free layer 90 rotate in response to this magnetic field. Preferably, the magnetization of first free layer 86 and the magnetization of first pinned reference layer 82 are parallel or antiparallel, and the magnetization of second free layer 90 and second pinned reference layer 94 also are parallel or antiparallel, as shown in FIG. 8*b*. This is because intermediate magnetization angles between free layers 86 and 90 and pinned reference layers 82 and 94, respectively, diminish the effect of the spin momentum transfer torque on mag-noise. The direction of the CPP current is chosen so that the spin momentum transfer torque opposes intrinsic damping in free layers 86 and 90. A CPP current, I (provided by a circuit such as current source 95), is directed depending on the magnetization directions of free layers 86 and 90 with respect to the magnetization of pinned reference layers 82 and 94. The ferromagnetic layers within MR stack 80 act as spin filters that polarize conduction electrons in the CPP current. Such a spin polarized CPP current exerts a significant torque on the localized electron spins in a ferromagnet. This effect is called spin momentum transfer, and is utilized to oppose the intrinsic damping torque in free layers 86 and 90, causing a reduction in noise in free layers 86 and 90. The direction of current I depicted in FIGS. 8*a* and 8*b* is for illustrative purposes and may be varied as $H_{bias}$, (and, consequently, $M_{FL1}$ and $M_{FL2}$) vary.

In summary, the present invention is a system and method of reducing noise due to thermally activated spin waves in a read head. The read head includes a free layer, a reference layer, and a spacer layer, the spacer layer being positioned between the free layer and the reference layer. To reduce noise, a magnetization of the reference layer is pinned in a fixed direction. A current, which is spin polarized by passing it through a ferromagnetic layer (such as the free layer or the reference layer), is passed perpendicular to a plane of the free layer, reference layer, and spacer layer such that the current exerts a spin momentum transfer torque on localized electron spins to reduce noise due to thermally activated spin waves. The spin momentum transfer torque opposes the intrinsic damping of the free layer, thereby reducing noise in the free layer.

Although the present invention has been described with reference to preferred embodiments, workers skilled in the art will recognize that changes may be made in form and detail without departing from the spirit and scope of the invention.

The invention claimed is:

1. A method of reducing noise due to thermally activated spin waves in a magnetoresistive element including a free layer, a reference layer, and a spacer layer, the spacer layer positioned between the free layer and the reference layer, the method comprising:
   pinning a magnetization of the reference layer in a fixed direction; and
   directing a spin polarized current perpendicular to a plane of the free layer, reference layer, and spacer layer, such that the current exerts a spin momentum transfer torque on localized electron spins to reduce noise due to thermally activated spin waves.

2. The method of claim 1, wherein the spin polarized current has a direction such that the spin momentum transfer torque opposes an intrinsic damping torque in the free layer.

3. The method of claim 1, wherein directing a spin polarized current comprises passing a current through a ferromagnetic material, the ferromagnetic material acting as an electron spin filter that polarizes conduction electrons in the current.

4. The method of claim 1, wherein pinning a magnetization of the reference layer comprises exchange coupling an antiferromagnet to the reference layer.

5. The method of claim 1, wherein pinning a magnetization of the reference layer comprises coupling a permanent magnet to the reference layer.

6. The method of claim 1, wherein a magnetization of the free layer is parallel to the magnetization of the reference layer in a quiescent state.

7. The method of claim 1, wherein a magnetization of the free layer is antiparallel to the magnetization of the reference layer in a quiescent state.

8. The method of claim 1, wherein the spacer layer is a nonmagnetic metallic spacer layer.

9. The method of claim 8, wherein a thickness and resistivity of the nonmagnetic metallic spacer layer are variable to adjust a magnitude of the spin momentum transfer torque.

10. The method of claim 8, wherein the nonmagnetic metallic spacer layer includes paramagnetic impurities to adjust a magnitude of the spin momentum transfer torque.

11. The method of claim 1, wherein the reference layer is a permanent magnet.

12. The method of claim 1, wherein the reference layer is a layer within a synthetic antiferromagnet.

13. A magnetoresistive (MR) element comprising:
   a reference layer having a magnetization pinned in a fixed direction;
   a free layer having a magnetization which rotates in response to an external magnetic field;
   a spacer layer positioned between the reference layer and the free layer; and
   a circuit for providing a current perpendicular to a plane of each of the layers in a direction that causes a reduction in thermally activated spin wave noise.

14. The MR element of claim 13, wherein the current is a spin polarized current that has a direction such that spin momentum transfer torque opposes an intrinsic damping torque in the free layer.

15. The MR element of claim 14, wherein the current is spin polarized by passing the current through a ferromagnetic material, the ferromagnetic material acting as an electron spin filter that polarizes conduction electrons in the current.

16. The MR element of claim 13, wherein the spacer layer is a nonmagnetic metallic spacer.

17. The MR element of claim 16, wherein a thickness and resistivity of the nonmagnetic metallic spacer layer are variable to adjust a magnitude of the spin momentum transfer torque.

18. The MR element of claim 13, wherein the spacer layer is a tunnel barrier.

19. The MR element of claim 13, wherein the reference layer is a soft ferromagnetic layer exchange coupled to an antiferromagnet.

20. The MR element of claim 13, wherein the reference layer is a soft ferromagnetic layer exchange coupled to a permanent magnet.

21. The MR element of claim 13, wherein the reference layer is a permanent magnet.

22. The MR element of claim 13, wherein the circuit for providing a current perpendicular to a plane of each of the layers comprises an external current source.

23. A magnetoresistive (MR) element having reduced thermally activated spin wave noise, the MR element comprising:
   a first reference layer having a magnetization pinned in a fixed direction;
   a first free layer having a magnetization which rotates in response to an external magnetic field;

a second free layer having a magnetization which rotates in response to an external magnetic field;

a second reference layer having a magnetization pinned in a fixed direction;

a nonmagnetic layer positioned between the first free layer and the second free layer;

a first spacer layer positioned between the first reference layer and the first free layer;

a second spacer layer positioned between the second free layer and the second reference layer; and a circuit for providing a current perpendicular to a plane of each of the layers such that the current exerts a spin momentum transfer torque on localized electron spins in the free layers, thereby reducing noise in the free layers.

24. The MR element of claim 23, wherein the spacer layers are nonmagnetic metallic spacer layers.

25. The MR element of claim 24, wherein a thickness and resistivity of the nonmagnetic metallic spacer layers are variable to adjust a magnitude of the spin momentum transfer torque.

26. The MR element of claim 24, wherein paramagnetic impurities are included in the nonmagnetic metallic spacer layers to adjust a magnitude of the spin momentum transfer torque.

27. The MR element of claim 23, wherein the nonmagnetic layer is a tunnel barrier.

28. The MR element of claim 23, wherein each reference layer is a soft ferromagnetic layer exchange coupled to an antiferromagnet.

29. The MR element of claim 23, wherein each reference layer is a soft ferromagnetic layer exchange coupled to a permanent magnet.

30. The MR element of claim 23, wherein each reference layer is a permanent magnet.

31. The MR element of claim 23, wherein the magnetization of the first free layer and the magnetization of the second free layer are biased orthogonally with respect to each other.

32. The MR element of claim 31, wherein the free layers are biased orthogonally with respect to each other using an electromagnet.

33. The MR element of claim 23, wherein the circuit for providing a current perpendicular to a plane of each of the layers comprises an external current source.

34. A method of sensing magnetically encoded information from a magnetic storage medium, the method comprising:

causing relative motion of the storage medium with respect to a current perpendicular to plane (CPP) magnetoresistive (MR) element;

directing a spin polarized current through the CPP MR element in a direction which exerts a spin momentum transfer that reduces noise due to thermally activated spin waves; and detecting a voltage across the CPP MR element.

* * * * *